United States Patent Office 3,435,054
Patented Mar. 25, 1969

3,435,054
ALPHA-ALKOXYALKYLAMINO-ANTHRA-
QUINONE DYES FOR GASOLINE
Joachim Kranz and Karl Maier, Ludwigshafen (Rhine), and Rudolf Polster, Frankenthal (Pfalz), Germany, assignors to Badische Anilin- & Soda-Fabrik Aktiengesellschaft, Ludwigshafen (Rhine), Germany
No Drawing. Filed Nov. 22, 1965, Ser. No. 509,150
Claims priority, application Germany, Nov. 25, 1964,
B 79,475
Int. Cl. C09b 1/16, 1/28; C10l 1/10
U.S. Cl. 260—378                    5 Claims

ABSTRACT OF THE DISCLOSURE

1-, 1,4- and 1,5-alkoxy alkylamino-anthraquinones of 3 or 4 carbon atoms in the alkyl group and 4 to 12 carbon atoms in the alkoxy group. These anthraquinones are highly soluble in petroleum products and are most useful in preparing concentrated stock solutions for coloring gasoline.

This invention relates to new dyes for petroleum products. More particularly, the present invention is directed to novel anthraquinone compounds and to solutions containing anthraquinone compounds.

The use of known anthraquinone dyes as coloring agents for petroleum products has been severely restricted because of the limited solubility of such dyes in organic solvents and gasoline. Consequently, it has been difficult to provide a stable solution of even moderate concentration of such a dye, for example 1,4-dianilinoanthraquinone, from which the dye will not settle. Solid dyes of this type are preferably added to gasoline for coloring purposes as a concentrated stock solution to ensure immediate and uniform distribution of the dye in the gasoline. Such a stock solution must be capable of forming a stable single phase system without the separation of solid material.

Short-chain alkylaminoanthraquinones, such as 1,4-bis-(butylamino)-anthraquinone and 1,4-bis-(pentylamino)-anthraquinone are known to be suitable as colorants for gasoline. These compounds crystallize from solution, however, and are not suitable for providing stock solutions containing at least 10 to 20% by weight of the dye for advantageous ease of handling in coloring gasoline. It has furthermore been described that mixtures of 1,4-di-aminoanthraquinones, which are substituted on the nitrogen by an alkyl group, have an increased solubility and yield stable solutions of higher concentrations than those obtainable with the components. The solubility of these dye mixtures nevertheless rarely exceeds 20% by weight.

It is therefore an object of the invention to provide new dyes which are suitable for coloring petroleum products and which have high solubility and high tinctorial strength in petroleum products and organic solvents. A further object is to provide stable stock solutions of high concentration that are suitable for continuously coloring petroleum products, especially gasoline. Still further objects will appear hereinafter.

These objects of the invention are achieved by the new compounds of the Formula I:

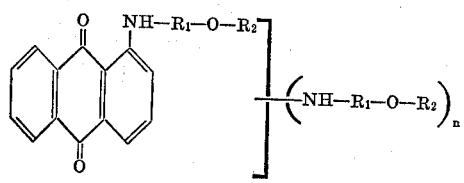

wherein $R_1$ represents 1,3-propylene or 1,3-butylene, $R_2$ represents an alkyl radical having 4 to 12 carbon atoms, $n$ is one of the integers 0 and 1, and wherein the second $-NH-R_1-O-R_2$ radical is attached to one of the positions 4 or 5 of the anthraquinone radical. Of the dyes covered by the above formula the derivatives of 1,4-diamino-anthraquinone are preferred for commercial reasons. The alkyl radical $R_2$ which contains 4 to 12 carbon atoms, preferably 5 to 10 carbon atoms, is advantageously a branched alkyl radical. Specific alkyl radicals $R_2$ are butyl, decyl, dodecyl, and particularly 2-ethylhexyl. However, further inear and branched alkyl radicals having 4 to 12 carbon atoms are suitable as well. The radicals specified above are merely those readily accessible in industry.

The new dyes are obtained according to processes known in the art of anthraquinone chemistry, for example by reacting 1-chloroanthraquinone, 1-nitroanthraquinone, 1,4-dichloroanthraquinone or 1,5-dinitroanthraquinone with amines having the general Formula II:

$$H_2N-R_1-O-R_2$$ 

(in which $R_1$ and $R_2$ have the above meanings) to form compounds having the Formula I or by reacting 1,4-dihydroxyanthraquinone in the presence of reducing agents or the leuco compounds of 1,4-dihydroxyanthraquinone or of 1,4-diaminoanthraquinone or mixtures of both with amines having the Formula II.

Reaction of chloroanthraquinones and nitroanthra-quinones with the amines having the Formula II proceeds merely by heating the components. To react 1,4-di-hydroxyanthraquinone both in 1-position and 4-position, reducing agents, such as zinc dust, are added as usual. Exchange of the two hydroxyl groups then takes place via the reduced form. It is also possible to start immediately from the leuco form of the 1,4-dihydroxy- or 1,4-di-amino compound or a mixture of the leuco form with 1,4-dihydroxyanthraquinone. In the reaction, which is advantageously carried out while excluding air, the leuco compounds react first and further leuco form is produced in a reduction-oxidation process. Complete oxidation of the reaction product to the anthraquinone derivative takes place finally during the working up of the product.

Examples of amines having the Formula II are 3-butoxypropylamine, 3-decyloxypropylamine, 3-dode-cyloxypropylamine and particularly 3-(2-ethylhexoxy)-propylamine.

The dyes according to the invention are extremely soluble in organic solvents and above all in petroleum products such as gasoline. They are furthermore readily soluble in oils, wax preparations and in plastics. The main use of the new dyes is however for coloring gasoline. In order to do this economically a stock solution which is as concentrated as possible and which must be stable against recrystallization of the dissolved dye is continuously and in very small amounts fed into a stream of gasoline which is thereby colored. A further requirement, of course, is that the colorants have a high tinctorial strength. These requirements which were unsatisfactorily met by the anthraquinone dyes known to the art so far, are easily fulfilled by the dyes of the invention. The stock solutions of the new dyes are preferably prepared with toluene or an aromatic cut of petroleum.

Since the new dyes are obtained in the first instance as oils, and since they mix readily with solvents or petroleum, products of any concentration can be prepared. For convenient use of the solutions we prefer however solutions with a dye content of up to 80% by weight. An example of a stock solution prepared according to the invention would be a solution consisting of 65% by weight of the dye of Example 1 and 35% of toluene.

If a certain shade of the colorant is desired which somewhat deviates from the shades of the new anthra-quinone dyes, it is possible to add further dyes known to the art as solvent dyes such as the red azo dye described in the Colour Index (1956) under C.I. No. 26050 having the formula:

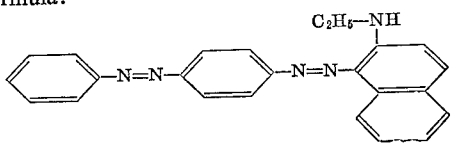

This dye for example can be added to a solution of the dye of Example 1 below in amounts of approximately 3% by weight with reference to the solution. However, if required for certain applications larger amounts of further solvent dyes can also be used in combination with the new dyes, for example a 1:1 mixture of the dye of Example 1 and the said azo dye dissolved in a petroleum fraction having a high aromatic content to form a 40% solution.

As was indicated above, the new dyes have a high molecular extinction and therefore only very small amounts are necessary to give a light shade desired in gasoline. As a rule, up to 100 grams, preferably from 4 to 80 grams, for example 40 grams, per 1000 gallons are added to the gasoline.

The following examples illustrate the subject invention. Parts are by weight. Parts by weight bear the same relation to parts by volume as the kilogram to the liter. Percentages are also by weight.

Example 1

10 parts of zinc dust and 48 parts of 1,4-dihydroxyanthraquinone are introduced into 75 parts of 3 - (2-ethylhexoxy) - propylamine at 50° C. The mixture is heated to 60° to 70° C. for two hours and then air is sucked therethrough for one hour. The whole is then diluted with 80 parts of benzene, filtered and the benzene distilled off from the filtrate. The dye having the formula:

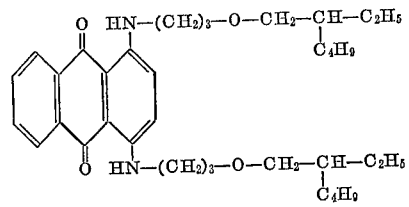

is obtained in a quantitative yield. The dye is obtained first of all as an oil and may be caused to crystallize with alcohol.

In addition to benzene, the dye dissolves extremely well in gasoline, toluene and acetone.

By following the above procedure but using 71 parts of butoxypropylamine and heating for six hours at 60° to 70° C., a similar dye is obtained which dissolves well in organic solvents. This dye has the formula

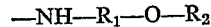

About 10 g. of these dyes per cubic meter of gasoline may be used for coloring gasoline.

Example 2

50 parts of α - nitroanthraquinone, 65 parts of 3-(2-ethylhexoxy) - propylamine and 60 parts of N - methyl-pyrrolidone are heated for three hours at 120° to 130° C. while stirring. The mixture is then introduced into 1000 parts by volume of 5% hydrochloric acid, the dye is extracted with benzene and isolated from the benzene solution. The dye having the formula:

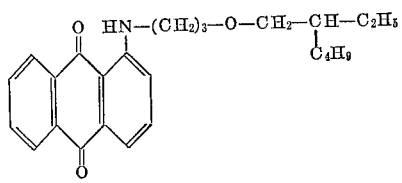

is obtained as a red oil in practically a quantitative yield. It dissolves extremely well in organic solvents.

Example 3

12 parts of 1,4 - dihydroxyanthraquinone, 12 parts of the leuco compound of 1,4 - dihydroxyanthraquinone and 50 parts of 3 - (2 - ethyl-hexoxy) - propylamine are heated in 150 parts of methanol under reflux for twenty-four hours in a nitrogen atmosphere. The solvent is distilled off and the residue is distilled with steam. The reaction product is dissolved in butanol, filtered and the solvent is distilled off. The viscous blue residue crystallizes after prolonged standing. The yield is 44 parts.

The dye thus obtained is identical with the dye obtained according to Example 1.

Example 4

494 parts of 1,4 - dihydroxyanthraquinone, 130 parts of the leuco compound of 1,4 - diaminoanthraquinone and 585 parts of 3 - butoxypropylamine in 1560 parts of methanol are boiled under reflux for fourteen hours. The methanol is distilled off and the whole is heated for about three to four hours in a water jet vacuum (bath temperature 120° to 130° C.). 955 parts of a dye is obtained which is identical with the dye obtained according to paragraph 3 of Example 1.

We claim:

1. A dye of the formula:

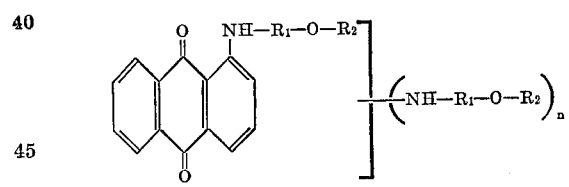

wherein $R_1$ represents a member selected from the group consisting of 1,3 - propylene and 1,3 - butylene, $R_2$ represents an alkyl group with 4 to 12 carbon atoms and $n$ represents one of the numbers 0 and 1 and wherein the second radical —NH—$R_1$—O—$R_2$ is attached to the anthraquinone nucleus in one of the positions 4 and 5.

2. A dye according to claim 1 wherein $R_1$ represents a 1,3-propylene radical and $R_2$ represents a member selected from the group consisting of butyl, decyl, dodecyl and 2-ethylhexyl and wherein the second radical

—NH—$R_1$—O—$R_2$ is attached in the 4-position to the anthraquinone nucleus.

3. A dye according to claim 1 wherein $R_1$ represents a 1,3-propylene radical and $R_2$ a 2-ethylhexyl radical and wherein the second amino radical is attached in the 4-position to the anthraquinone nucleus, said dye having the formula:

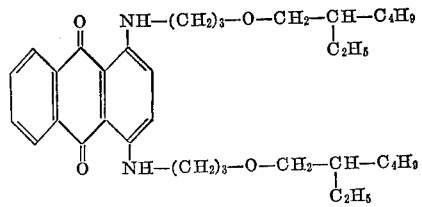

4. A dye according to claim 1 wherein $R_1$ represents a 1,3 - propylene radical and $R_2$ represents an n-butyl radical and wherein the second amino radical is attached in the 4-position to the anthraquinone nucleous, said dye having the formula:

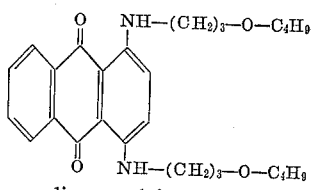

5. A dye according to claim 1 of the formula

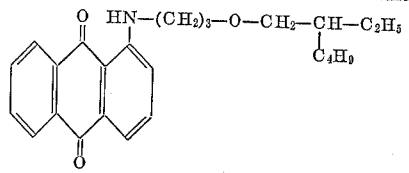

References Cited

UNITED STATES PATENTS 2,611,772  9/1952  Allen et al. _____ 260—378
3,164,449  1/1965  Buxbaum _____ 260—378 XR LORRAINE A. WEINBERGER, *Primary Examiner.*
HAROLD C. WEGNER, *Assistant Examiner.*

U.S. Cl. X.R.
44—59